United States Patent [19]

Smigel

[11] 3,998,984
[45] Dec. 21, 1976

[54] SODIUM TETRABORATE CARRIER COATING FOR ROD

[75] Inventor: Walter Andrew Smigel, Homer, N.Y.

[73] Assignee: Pennwalt Corporation, Philadelphia, Pa.

[22] Filed: Nov. 14, 1975

[21] Appl. No.: 631,977

Related U.S. Application Data

[62] Division of Ser. No. 430,437, Jan. 3, 1974, Pat. No. 3,936,314.

[52] U.S. Cl. .............................. 427/384; 427/435
[51] Int. Cl.$^2$ ............................. B05D 3/02
[58] Field of Search ............. 106/243, 266; 252/18; 427/372, 435, 384

[56] References Cited

UNITED STATES PATENTS 2,609,594   9/1952   Whitbeck .......................... 252/18
3,313,729   4/1967   Glasson ............................ 252/18

*Primary Examiner*—Ronald H. Smith
*Assistant Examiner*—Janyce A. Bell
*Attorney, Agent, or Firm*—Robert G. Danehower

[57] ABSTRACT

Sodium tetraborate based carrier coatings for wire drawing are prepared by dispersing a water insoluble fatty acid metal salt in a sodium tetraborate coating bath. The carrier coatings on rod are made resistant to atmosphere moisture by heating at an elevated temperature.

Carrier coatings on wire rod provide a vehicle to pick up the wire drawing lubricant in the soap box and carry the lubricant into the die. Since the coated wire rod is often stored for long periods between coating and drawing it is susceptible to corrosion from atmospheric moisture.

6 Claims, No Drawings

SODIUM TETRABORATE CARRIER COATING FOR ROD

This is a division of application Ser. No. 430,437, filed Jan. 3, 1974 now U.S. Pat. No. 3,936,314.

BACKGROUND OF THE INVENTION

The two principal carrier coatings for drawing rod are based on borax or lime. Lime carrier coatings have two main disadvantages. First, it is difficult to apply a lime coating since the lime floats in the water. Secondly, the lime coating flakes off lime particles in the work area causing disagreeable breathing conditions and dirty work areas.

Borax carrier coatings do not have the dusty flaking problem associated with lime coatings but borax carrier coatings suffer from the disadvantage that they pick up excessive moisture from the air during storage periods in the hot humid spring and summer weather. Excessive moisture from the air causes the borax coating to become soft and unuseable with the result that the coil must be sent back for recoating.

In addition to providing a carrier to pick up the drawing lubricant and carry it into the die the carrier coating should also be compatible with the wire processing steps following the drawing operation. If the wire is to be copper or tin coated then the carrier coating residue must be easily removed in a cleaning operation. If the wire is to be welded it is important that the carrier coating does not interfere with the welding operation. If the wire is for making nails then the carrier coating should not interfere with any wire cutting operation in the nail machine. Any lubricating qualities provided by the carrier coating is, of course, an added advantage.

SUMMARY OF INVENTION

I have now discovered that if a substantial amount of a water-insoluble metal soap is incorporated into a borax carrier coating under specified conditions, it will render the coating resistant to softening by atmospheric moisture. These metal soaps will be in the form of calcium, aluminum, barium, magnesium or zinc soaps. Suitable soaps are derived from the fatty acids having about 12 to about 13 carbon atoms. It is unimportant whether or not the fatty acids are saturated or unsaturated. One or a mixture of metal soaps are satisfactory for incorporating into the borax.

The amount of water-insoluble metal soap that will make the borax carrier coating retard moisture pickup will vary from about 10 to about 30% by weight of the coating. In addition the coating will contain from about 1 to about 5% by weight of organic dispersing or emulsifying agents required to keep the metal soap emulsified in the coating bath. The balance of the carrier coating will be from about 65 to about 89% sodium tetraborate. Various other ingredients may appear in the coating as may be required in the wire coating bath for neutralizing pickling acid, for wire corrosion resistance, for iron sequestering and for modifying the viscosity of the bath.

The carrier coating is placed on the rod either by immersion of wire coils in the coating bath or by continuously running the wire through the bath. After immersion in the coating bath the coils of rod are put into a baker where the coils are heated to about 300°–450° F for 2 to about 5 minutes to dry the coating.

After the coils are removed from the baker they can be stored for several days without deteriorating due to moisture pick-up from the atmosphere until they are required for drawing.

DETAILED DESCRIPTION OF THE INVENTION

The sodium tetraborate based carrier coating is obtained from a coating bath into which the rod coils are immersed or else the rod is passed through the bath continuously as a strand. The rod is wetted by the coating dispersion and/or emulsion and as the rod leaves the coating bath the rod carries with it a quantity of the dispersion and/or emulsion. The terms dispersion and emulsion are used interchangeably throughout the specification and claims. The excess of the dispersion drops off after which the residue dries on the rod. The composition of the coating dispersion determines the composition of the carrier coating. The coating must then be heated at an elevated temperature to remove water and to render it moisture resistant.

The coating bath is prepared by first adding water to a tank and then the coating concentrate is added, preferably in powder or granular form with agitation. The concentrate is added to the water at about 8 to about 32 oz. per gallon of water.

The carrier coating concentrate will contain about 10 to about 30% by weight of one or more water-insoluble metal soaps, from about 65 to about 89% by weight of sodium tetraborate and from about 1 to about 5% by weight of one or more organic emulsifying agents which are stable under alkaline conditions. The water-insoluble metal soaps in the coating concentrate will be obtained from one or more of the metal soaps selected from the group consisting of calcium, magnesium, aluminum, barium and zinc soaps of the fatty acids having from about 12 to about 18 carbon atoms. These fatty acids may be saturated, unsaturated or mixtures thereof.

Calcium derived from lime is the cheapest metal available and is widely used for this purpose. Calcium stearate is a preferred metal soap because of its availability and low cost.

Suitable fatty acid sources for the metal soaps are tridecoic, myristic, palmitic, stearic, linoleic, oieic, and linolinic acids. Mixtures of the above acids are also suitable such as tallow acid which is a mixture of oleic, stearic and palmitic acids. These acids will have a titer ranging from about 39° to 60°. The amount of free fatty acid in the metal soap should not exceed about 0.1% by weight.

If the metal soap is not commercially available the soaps can be prepared by saponifying the fatty acid with a metal base using procedures well known in the art for making soap. Stearic acid is a preferred source of fatty acid because of its availability and low cost.

The sodium tetraborate can be added as either the 5 water or 10 water of crystallization salt. The sodium tetraborate concentration will be about 65 to about 89% by weight of the concentrate calculated as the five water compound. The balance of the concentrate will be about 1 to about 5% by weight of an organic emulsifier required to disperse and emulsify the water-insoluble metal soap in the coating bath. Sodium tetraborate is readily soluble in water.

The emulsifier can be one or more of a large group of organic emulsifiers as are well known in the art which are stable in alkaline solutions. Examples of suitable emulsifiers are:

Alkamine C. Concentrate
Alrosol S solid
Aminol OL

Ardet DC
Clindrol 200 CGN
Conco Emulsifier K
Drutergent E
Emcol 5120, 5100, 5130
Emkagen Concentrate
Hallcomid M18-OL
Isoslushoff
Monamid 150-AD
Unamide 75
Witco 960

The composition of these emulsifiers as given in McCutcheon's Detergents and Emulsifiers are incorporated herein by reference. Combinations of one or more emulsifiers may be used as desired. Minor amounts of wetting agents may be employed to facilitate wetting of the wire with the coating solution but these are generally unnecessary as most emulsifiers also have some wetting properties.

In the manufacture of rod for wire drawing, acid pickling of the rod is usually required to remove mill scale and to clean the wire. On leaving the acid pickling operation the coils of rod are washed with water but nevertheless will carry with them a residual amount of acid into the carrier coating dispersion depending on the efficiency of the rinsing process. If this acid is allowed to build up it will split out the fatty acids from the metal soaps and render them useless. Accordingly, the coating concentrates preferably contain alkaline materials such as neutralizing alkali and alkaline buffering agents to overcome the acid drag-in. Additional alkaline materials may be added to the coating bath from time to time to adjust the pH within the range of about 7 to about 12 if desired.

Suitable alkalis for this purpose are one or more of the hydroxides, carbonates, and bicarbonates, where available, of sodium, potassium, barium, magnesium, calcium and aluminum.

Suitable buffering agents are the sodium or potassium polyphosphates. By polyphosphates is meant the pyrophosphates, for example the tetrasodium or tetrapotassium pyrophosphates; the tripolyphosphates such as sodium or potassium tripolyphosphates; and the hexametaphosphates such as sodium or potassium hexametaphosphates. In addition to their ability to neutralize acid, the polyphosphates are useful as sequestering agents. Mixtures of the neutralizing and buffering agents may be used as desired.

The amount of neutralizing or buffering agents, used in my coating concentrates are not critical and will usually be in the range of about 2 to about 10% by weight of the dry concentrate. Sufficient alkali must be present to keep the pH of the coating bath above 7 and preferably within the range of 7 to 12. However, separate additions of alkaline materials can be added to the coating dispersion when needed.

Other additives may be present in the coating concentrate and the coating dispersion for special purposes such as for corrosion inhibition and for foam prevention. Sodium nitrite is a typical corrosion inhibitor while octyl alcohol is a useful foam depressent. These agents are generally used at of concentration of 0.002 to 2.0% by weight of the dry concentrate.

The coating dispersion is prepared by adding water to a suitable tank such as a mild steel tank. Agitation must be applied to the tank in order to keep the water-insoluble metal soap in suspension. The agitation is conveniently supplied by pump recirculation of the coating liquid. The temperature of the water is adjusted within the range of 160° to 200° F.

The coating concentrate is then added in an amount ranging from about 8 to about 32 ounces per gallon of water. The concentration of the bath is maintained by periodic additions of the concentrate to the bath as may be determined by titrating for total alkalinity using methyl orange indicator and titrating with 1 normal hydrochloric acid. It has been determined that the insoluble metal soap leaves the bath on the wire rod at about the same rate as the water-soluble components.

At a concentration range of about 8 to about 32 ounces per gallon of water there will be added for each gallon of water from about 0.8 to about 9.6 ounces of water-insoluble metal soap, from about 7.4 to about 41.5 ounces of sodium tetraborate and from 0.1 to about 1.6 ounces of an organic dispersant. The 7.4 to 41.5 ounces per gallon of sodium tetraborate (five waters of crystallization) are equivalent to about 5.2 to about 28.5 ounces per gallon of anhydrous sodium tetraborate and from about 9.9 to about 54.3 ounces per gallon of the ten hydrate salt.

The coating dispersion will preferably contain from about 0.2 to about 3.2 ounces per gallon of alkaline materials as described above. It should be remembered in this connection that sodium tetraborate is an excellent buffering agent for acid in its own right. The coating dispersion must be maintained alkaline preferably within a pH of about 7 to about 12 otherwise the fatty acid will split out from the metal soap. Periodic additions of the alkaline materials may be made to the coating dispersion as required.

Corrosion inhibitors and/or other special additives are used in the coating bath at about 0.002 to about 2.0 ounces per gallon of coating dispersion.

The concentration of the bath is one method of controlling the thickness of the carrier coating on the wire rod with heavier coatings produced by the more concentrated solutions.

During coating of the wire rod by immersion in the coating bath the temperature of the dispersion is maintained at about 160° to about 200° F. Slightly heavier coatings are produced at the higher temperature. The immersion time is not critical and will generally be from about 6 seconds to about 1 minute. Slightly heavier coatings are obtained with the longer immersion periods.

The sodium tetraborate-metal soap layer which forms on the rod is a smooth, shiny amorphous coating. As the sodium tetraborate leaves the coating bath on the wire rod it will contain a number of waters of crystallization which are then removed after the coating film has dried by heating at elevated temperatures.

The ability of the sodium tetraborate metal soap coating to resist moisture is obtained by heating the coated rod, for example in a baker, at a temperature ranging from about 300° to about 450° F. The baker is a conventional gas fired, forced air circulation oven. Generally the rod coils will remain in the baker for a period ranging from about 1 minute to about 30 minutes. The heat retained by the coil from immersion in the coating bath also assists in the drying of the coating.

After baking the rod coils are placed in storage until they are required for drawing. I have found that the rods which are coated with the metal soap-sodium tetraborate coating as described above will resist softening from atmospheric humidity for periods of 2 to 3 days, even in the summer months. Borax coatings without the metal soap are often unuseable after 3 or 4 hours under the same conditions of high temperature and high humidity.

For wire drawing processes the wire rod coated with the sodium tetraborate-metal soap carrier coating is drawn through a soap box where the drawing lubricant is picked up and carried into the drawing die or dies depending on the number of holes required. The sodium tetraborate-metal soap coating has another advantage over the prior art lime or borax coatings in that the sodium tetraborate-metal soap combination provides a certain amount of lubricity for the wire drawing.

The sodium tetraborate-metal soap carrier coating also acts as a welding flux and cleaning of the coated rod prior to welding is unnecessary. Where cleaning of the wire is necessary such as for tin or copper plating, the residue of the sodium tetraborate-metal soap coating is readily removed by water and detergents.

In another aspect of my invention I have been able to mix my sodium tetraborate-metal soap concentrate with a typical borax carrier coating concentrate and render the resultant mixture substantially less susceptable to moisture pickup.

The best mode of carrying out my invention will be evident from a consideration of the following examples.

EXAMPLE 1

A calcium-stearate carrier coating concentrate was prepared by placing 71.3 lbs. of sodium tetraborate (5 waters of crystallization) in a double arm sigma blade mixer. The steam to the heating jacket was turned on and 4.5 lbs. of tetrasodium pyrophosphate, 4.5 lbs. of soda ash and 1.9 lbs. of sodium nitrite were added with the mixer blade operating. After about 15 minutes of mixing, 15.4 lbs. of calcium-stearate, 1 lb. of diethylene glycol, 1.6 lbs. of emulsifier (1.0 lb. Witco 960 and 0.6 lb. of Emcol 5130), were added to the mixer. Mixing was continued with the heat applied until there was a thorough fusing of the salts after which mixing and heating was continued until there was no longer any tacky feeling of the chemicals to the touch. Upon completion of the mixing the concentrate, weighing about 100 lbs. was discharged into drums and after air cooling was ground so that it passed through ¼ inch mesh screen.

EXAMPLE 2

Following the procedure of Example 1, a calcium stearate-borax coating concentrate was prepared from the following ingredients:

| | |
|---|---|
| Sodium tetraborate ($5H_2O$) | 63 lbs. |
| Trisodium phosphate | 10 lbs. |
| Soda ash | 2 lbs. |
| Sodium nitrite | 5 lbs. |
| Emulsifiers | 5 lbs. |
| Calcium stearate | 15 lbs. |
| Total | 100 lbs. |

The above concentrate was dispersed in water and then used to coat wire rod. Immersion time was 1 minute at 190° F. At a coating weight of 0.311 grams per kilogram of wire rod the moisture pick-up versus time in a humidity chamber at 100% relative humidity and 68° F. temperature was observed:

| Time (Hours) | Moisture (% weight) |
|---|---|
| ½ | 19.1 |
| 2½ | 29.7 |
| 3½ | 31.8 |
| 5 | 32.2 |

EXAMPLE 3

Following the procedure of Example 2, a calcium stearate-borax coating concentrate was prepared from the following ingredients:

| | |
|---|---|
| Sodium Tetraborate ($5H_2O$) | 57 lbs. |
| Tetrasodium pyrophosphate | 2 lbs. |
| Soda ash | 8 lbs. |
| Sodium nitrite | 3 lbs. |
| Emulsifiers (as above) | 5 lbs. |
| Calcium stearate | 25 lbs. |
| Total | 100 lbs. |

Wire coated from an aqueous dispersion of the above concentrate at a coating thickness of 0.297 grams per kilogram of wire showed the following moisture absorption:

| Time (Hours) | Moisture (% weight) |
|---|---|
| ½ | 27.1 |
| 2½ | 28.0 |
| 3½ | 30.3 |
| 5 | 31.3 |

EXAMPLE 4

Following the procedure of Example 2, a calcium tallowate-borax coating concentrate was prepared from the following ingredients:

| | |
|---|---|
| Sodium tetraborate ($5H_2O$) | 71 lbs. |
| Soda ash | 5 lbs. |
| Tetrasodium pyrophosphate | 5 lbs. |
| Sodium nitrite | 2 lbs. |
| Emulsifiers (as above) | 5 lbs. |
| Calcium tallowate | 12 lbs. |
| Total | 100 lbs. |

Wire coated from an aqueous dispersion of the above concentrate at a coating thickness of 0.329 grams per kilogram of wire showed the following moisture absorption:

| Time (Hours) | Moisture (% weight) |
|---|---|
| ½ | 29.7 |
| 2½ | 31.9 |
| 3½ | 34.8 |
| 5 | 37.3 |

EXAMPLE 5

Following the procedure of Example 2, an aluminum stearate-borax coating concentrate was prepared from the following ingredients:

| | |
|---|---|
| Sodium tetraborate ($5H_2O$) | 71 lbs. |
| Tetrasodium pyrophosphate | 5 lbs. |
| Soda ash | 5 lbs. |

-continued

| | |
|---|---|
| Sodium nitrite | 2 lbs. |
| Emulsifiers (as above) | 5 lbs. |
| Aluminum stearate | 12 lbs. |
| Total | 100 lbs. |

Wire coated from an aqueous dispersion of the above concentrate at a coating thickness 0.340 grams per kilogram of wire showed the following moisture absorption:

| Time (Hours) | Moisture (% weight) |
|---|---|
| ½ | 26.4 |
| 2½ | 32.2 |
| 3½ | 36.9 |
| 5 | 40.0 |

EXAMPLE 6

Following the procedure of Example 2, a zinc stearate-borax coating concentrate was prepared from the following ingredients:

| | |
|---|---|
| Sodium tetraborate (5H$_2$O) | 71 lbs. |
| Tetrasodium pyrophosphate | 5 lbs. |
| Soda ash | 5 lbs. |
| Sodium nitrite | 2 lbs. |
| Emulsifiers (as above) | 5 lbs. |
| Zinc stearate | 12 lbs. |
| Total | 100 lbs. |

Wire coated from an aqueous dispersion of the above concentrate at a coating thickness of 0.249 grams per kilogram of wire showed the following moisture absorption:

| Time (Hours) | Moisture (% weight) |
|---|---|
| ½ | 22.6 |
| 2½ | 25.5 |
| 3½ | 25.5 |
| 5 | 29.0 |

EXAMPLE 7

Under the same conditions as the preceeding examples, wire coated with a borax concentrate (72.5% weight borax (10H$_2$O) not containing any water insoluble metal soap was tested for moisture absorption with the following results:

| | Coating Thickness | |
|---|---|---|
| Time (Hours) | 0.411 g/Kg. Moisture (% wt.) | 0.305 g/Kg. Moisture (% wt.) |
| ½ | 38.3 | 51.7 |
| 2½ | 42.7 | 53.3 |
| 3½ | 42.8 | 82.0 |
| 5 | 47.8 | 84.4 |

EXAMPLE 8

Calcium-stearate was prepared from stearic acid and lime in a steam jacket sigma blade mixer. 52½ lbs. of acid and 27½ lbs. water were charged to the mixer and the steam was turned on in the jacket and the mixer started. Heating was continued until the stearic acid reached the temperature of 150° to 160° F. 10 lbs. of lime were added to the melted stearic acid and mixing was continued for 5 to 10 minutes until the saponification was complete. This was determined by analyzing the mixture for free fatty acids which should analyze 1/10% or less by weight.

EXAMPLE 9

The effect of temperature on the coating weight of a calcium stearate carrier coating was determined by placing the coating concentrate of Experiment 1 in water at a concentration of 24 oz. per gallon. Coating weights were determined at 180°, 190° and 200° F. The coating weights were observed by immersion of a coil of rod in the bath and holding it in the bath for a time of about 2 minutes to allow the rod to reach the bath temperature. Thereafter, the coils were removed from the coating baths, allowed to drain and dry. The coating was then stripped from a portion of each coil and coating weight determinations were made. At 180° F., the coating weighed 0.844 grams per kilogram of rod. At 190° F., the coating weighed 1.06 grams per kilogram of rod. At 200° F., the coating weighed 1.07 grams per kilogram of rod.

EXAMPLE 10

The effect of coating time on coating weight was determined by immersion of wire rod in the carrier coating baths for varying periods and then determining the amount of coating after drying. The composition of Experiment 1 was added to water at a concentration of 24 ounces per gallon. Rod coils were immersed in this bath for periods of 15, 30, and 60 seconds, respectively. The coils were removed from the coating bath, allowed to drain and dry, and thereafter the coatings were stripped from a portion of the rod and coating weights determined. At 15 seconds, the coating weighed was 0.793 grams/kilogram of rod. At 30 seconds, the coating weighed 0.862 grams/kilogram of rod. At 60 seconds, the coating weighed 1.06 grams/kilogram of rod. Bath temperatures were maintained at 190° F. in all of the determinations.

EXAMPLE 11

The ability of the sodium tetraborate-water insoluble soap carrier coatings to carry lubricant in wire drawing was observed in a wire drawing plant.

COATING DISPERSION MAKEUP

A mild steel tank was completely cleaned and washed out to remove all traces of previous carrier coatings. Approximately 1720 gallons of water were added to the tank and heated to 160° F. 1200 lbs. of the composition of Experiment 1 were then added with agitation to the tank. After a uniform dispersion was obtained a portion of the dispersion was titrated with 1N hydrochloric acid and 9.6 milliliters of solution was used. 90 to 100 lbs. of additional concentrate were then added and on retesting the dispersion, 11.5 milliliters of titrating solution were used. At a bath temperature of 175° the dispersion had a milky white color.

COATINGS

Pin No. 1 contained three coils of 7/32 of an inch C1008 low carbon steel. Each coil weighed about 1200 lbs., making a compacted bundle of 3600 lbs. The coils had been acid cleaned and water rinsed. Pin No. 1 containing the three coils was dipped into the carrier coating bath for a total of 6 seconds immersion time at 175° F. A second pin containing 3 coils of the same rod was immersed for a total time of about 6 seconds at 175° F. Both pins were then placed on an endless conveyor which moved through the baker which was set at a temperature of 300° F. Time in the baker was from 1 to about 3 minutes. The coating on the rod was difficult to see but had a dry smooth surface to the touch of the hand.

Five additional loads of 7/32 inch C1008 coils were coated with total immersion times between 5 and 8 seconds at 175° F. The baker was set at 350° F. for these 5 loads of coils, and the drying time was approximately 1 to 3 minutes.

WIRE DRAWING

The first load of the 7/32 inch C1008 coated rod was taken to No. 11 wire drawing machine. It was drawn 3 holes down to 0.142 inch size. The drafting was 0.191 inch, 0.165 inch and finish size 0.142 inch. The machine speed was 1350 PPM. The blocks were all running hot. The lubricant used was R. H. Miller CXH in the ripper box only. The residual coating was stripped off at No. 2 die but on the final block, the finish was satisfactory. There was good carry-through of lubricant on all three of the blocks and the wire was for chain link fabric and would be galvanized.

A second load of wire was taken to No. 18 machine which was a 2 hole double deck motor block and it would be drawn 2 holes to 0.142. The first draft was 0.176 inch and the finish draft was 0.142 inch. The speed of this motor block was 800 FPM. The lubricant used was R. H. Miller CXH in the ripper only and the second soap box remained empty. The carry-through of lubricant and coating was very good and the finish on the wire was satisfactory and this wire was also used for chain link fabric and was galvanized.

A third load was taken to No. 1 machine and was drawn 5 holes to 0.080 inch; no draftings were recorded. The finish speed was 1700 FPM and all blocks were hot. The lubricant used was half CXH and half lime in the ripper box only. The carry-through on all blocks was good and the finish was satisfactory and acceptable and this wire was also for continuous galvanizing.

EXAMPLE 12

The ability of the sodium tetraborate-water-insoluble metal soap carrier coatings to resist atmospheric humidity was observed by comparing the moisture absorbed by the coating with a sodium tetraborate carrier coating containing a water-soluble sodium soap. The amount of moisture absorbed was measured at varying coating weights.

The sodium tetraborate-water insoluble soap used had the composition of the concentrate disclosed in Experiment 1. The Borax-water soluble sodium soap had the following composition expressed in percent by weight: sodium tetraborate (10 waters)—72.5%, soda-ash—12%, sodium tallow soap—5%, sodium nitrite—3.0%, tetrasodium pyrophosphate—5.0%, sodium metasilicate—2.0%, emulsifier—0.5%.

All coating bath temperatures were maintained at 190° F. Various amounts of the concentrates were used in the coating baths to obtain different coating weights on the wire rod. After the rod was cooled, the rods were placed in humidity chambers held at 90 and 95% relative humidity at 68° F temperature. The increase in weight as a percentage of the coating weight was determined at varying time intervals. The increase in weight as a percentage of the coating weight was determined at varying time intervals. The results are shown in Table 1 for the sodium tetraborate-water insoluble soap and in Table 2 for the sodium-tetraborate-water soluble soap coating.

TABLE I

Moisture Pickup of Sodium Tetraborate-Water Insoluble Soap Coating

| Concentration in Coating Baths | 24 oz/gal. | 12 oz/gal. | 12 oz/gal. |
|---|---|---|---|
| Coating Weights | 1.07 g/Kg. | 0.402 g/Kg. | 0.349 g/Kg. |
| Time (Hours) | Moisture Pick-up (% Wt.) | | |
| ½ | 18.2 | 23.0 | 30 |
| 1 | 27.3 | | |
| 1½ | | 25.4 | 34.1 |
| 2½ | | 26.4 | |
| 3 | | | 38.8 |
| 3½ | 36.4 | | |
| 5½ | | 24.9 | |
| 6½ | 36.4 | | |
| 7½ | | 24.9 | |

TABLE II

Moisture Pick-up of Sodium Tetraborate-Water Soluble Soap Coating

| Concentration in Coating Baths | 24 oz/gal. | 24 oz/gal. | 24 oz/gal. |
|---|---|---|---|
| Coating Weights | 0.166 g/Kg. | 0.320 g/Kg. | 0.457 g/Kg. |
| Time (Hours) | Moisture Pick-up(% wt.) | | |
| ½ | 100 | 45.2 | 35.7 |
| 1 | 150 | | |
| 1½ | | 64.9 | 52.0 |
| 2½ | | | 72.1 |
| 3 | | 69.9 | |
| 3½ | 150 | | |
| 5½ | | | |
| 6½ | 150 | | |
| 7½ | | | |

In all cases, the moisture pick-up was much greater for the combination of sodium tetraborate-water soluble soap as compared with the sodium tetraborate-water-insoluble soap composition.

EXAMPLE 13

It was determined that a typical water absorbing sodim tetraborate carrier coating could be rendered much more resistant to water pick-up by adding varying portions of the sodium tetraborate-metal soap concentrate shown in Example 1. The borax concentrate contained 97.9% by weight borax and 2.1% tetrasodium pyrophosphate. Coatings were applied from baths held at temperatures of 190° F. and varying bath concentrations were used in an attempt to obtain similar coating weights for comparing moisture absorption. The results are shown in Table III.

TABLE III

Moisture Pick-up-Borax Carrier Coating Compared to Borax-Carrier Concentrate Mixed with Sodium Tetraborate Calcium Stearate Concentrate

| | Borax Coating | 1 Part Borax Concentrate<br>4 Parts Sodium Tetraborate<br>Calcium Stearate Concentrate | 1 Part Borax Concentrate<br>9 Parts Sodium-Tetraborate<br>Calcium Stearate Concentrate |
|---|---|---|---|
| Concentration in Coating Bath | 24 oz/gal. | 12 oz/gal. | 10 oz/gal. |
| Coating Weight | 0.350 g/Kg. | 0.374 g/Kg. | 0.394 g/Kg. |
| Time (Hours) | Moisture Pick-Up (% wt.) | | |
| ½ | 24.3 | 22.6 | 21.9 |
| 1 | 30.9 | 26.1 | 20.7 |
| 2 | 44.9 | 33.5 | 22.1 |
| 4½ | 53.6 | 38.6 | 21.9 |
| 6½ | 58.9 | 39.7 | 20.2 |

The moisture reduction caused by the addition of the sodium tetraborate-water insoluble metal soap to the borax concentrate is quite apparent.

I claim:

1. The process of coating wire rod with a carrier coating comprising immersing the wire rod in an aqueous coating dispersion containing about 8 to about 32 ounces per gallon of water of the concentrate consisting essentially of from about 10 to about 30% by weight of one or more water insoluble metal soaps selected from the group consisting of calcium, barium, aluminum, magnesium and zinc soaps of fatty acids having from about 12 to about 18 carbon atoms, from about 65 to about 89% by weight of sodium tetraborate, and from about 1 to about 5% by weight of one or more organic dispersing agents, removing the wire rod from the aqueous coating solution in a manner to allow the excess coating material to drain off of the rod, and heating the coated wire rod at a temperature within the range of about 350° to 450° F., to evaporate water from the coating.

2. The process of claim 1 in which the aqueous coating dispersion is maintained within the range of about 160° to about 200° F.

3. The process of claim 2 in which the pH of the aqueous coating dispersion is maintained within the range of about 7 to 12.

4. The process of coating wire rod with a carrier coating comprising-immersing the wire rod in an aqueous coating dispersion containing about 8 to about 32 ounces per gallon of water of the concentrate consisting essentially from about 10 to about 30% by weight of one or more water insoluble metal soaps selected from the group consisting of calcium, barium, aluminum, magnesium and zinc soaps of fatty acids having from about 12 to 18 carbon atoms, from about 65 to 89% by weight of sodium tetraborate, from about 1 to about 5% by weight of one or more organic dispersing agents, and from about 2 to about 10% by weight of one or more alkaline materials selected from the group consisting of the hydroxides, carbonates and bicarbonates of sodium, potassium, barium, magnesium, calcium and aluminum and the polyphosphates of sodium and potassium, removing the wire rod from the aqueous coating solution, and heating the wire rod at a temperature within the range of about 350° to 450° F. to evaporate water from the coating.

5. The process of claim 4 in which the aqueous coating dispersion is maintained within the range of about 160° to 200° F.

6. The process of claim 5 in which the pH of the aqueous coating dispersion is maintained within the range of about 7 to 12.

* * * * *